United States Patent [19]

Zafiroglu

[11] Patent Number: 4,879,169

[45] Date of Patent: Nov. 7, 1989

[54] QUILTED ELASTIC COMPOSITE FABRIC

[75] Inventor: Dimitri P. Zafiroglu, Wilmington, Del.

[73] Assignee: E. I. Du Pont de Nemours and Company, Wilmington, Del.

[21] Appl. No.: 179,620

[22] Filed: Apr. 11, 1988

[51] Int. Cl.[4] ............................................. D03D 3/00
[52] U.S. Cl. .................................... 428/230; 28/107; 28/156; 112/413; 112/438; 428/102; 428/234; 428/245; 428/253; 428/284
[58] Field of Search ............... 428/102, 230, 234, 245, 428/253, 284; 28/107, 156; 112/413, 438

[56] References Cited

U.S. PATENT DOCUMENTS

| | | | |
|---|---|---|---|
| 3,316,136 | 4/1967 | Pufahl | 156/164 |
| 3,468,748 | 9/1969 | Bassett | 161/122 |
| 3,575,782 | 5/1967 | Hansen | 161/141 |
| 4,446,189 | 5/1984 | Romanek | 428/152 |
| 4,657,802 | 4/1987 | Morman | 428/152 |
| 4,704,321 | 11/1987 | Zafiroglu | 428/230 |
| 4,773,238 | 12/1988 | Zafiroglu | 66/192 |

*Primary Examiner*—Marion C. McCamish

[57] ABSTRACT

An elastic quilted composite fabric is provided. The quilted fabric has at least one gathered fibrous layer and at least one elastic fabric layer. The elastic fabric layer preferably includes ½ to 10% by weight of spandex fibers and is a stitch-bonded fabric whose elastic characteristics are not activated until after the various layers of the composite fabric have been quilted together.

8 Claims, No Drawings

QUILTED ELASTIC COMPOSITE FABRIC

BACKGROUND OF THE INVENTION

1. Field of the Invention

This invention relates to a quilted, elastic, composite fabric and a process for making it. More particularly, the invention concerns such a fabric having an elastic fibrous layer that is quilted to other fibrous layers.

2. Description of the Prior Art

Quilted fabrics are well known in the art. Most known quilted fabrics include a layer of bulky fibrous material that is enclosed in and quilted to woven or knitted fabric. The enclosing fabric protects the bulky fibrous layer and provides desired surface. Some quilted fabrics have no enclosing fabric. The fibrous layer of the known quilts usually is formed from a batt of loose fibers, a lightly felted batt, or a batt of bonded fibers. The most commonly used batt-forming processes (i.e., carding and cross-lapping) result in flat, layered batts, that generally lack resiliency, are inelastic and collapse under heavy loads.

To provide greater resilience to quilted fabrics, the art has suggested the use of batts made of fibers of larger diameter or higher density batts, such as those made by Rando-Webber air-laydown techniques or more ordinary densification techniques. However, quilted fabrics incorporating such batts are stiffer, less conformable, and less stretchable, and provide less insulation per unit weight.

Several methods have been suggested in the art for making elastic composite fabrics. These methods usually involve securing at least one layer of nonwoven textile fabric to an elastic means or elstic layer. One or the other of two general methods usually is used.

In the first general method, a recoverable, elastomeric web is attached to a second web which is not elastic but can be stretched or drawn beyond its recoverable limits. The thusly attached webs are then stretched and relaxed. The elastic web recovers and the non-elastic web gathers and buckles. This general method is illustrated, for example, by Ronanek, U. S. Pat. No. 4,446,189, and Pufahl, U. S. Pat. No. 3,316,136, among others.

In the second general method known for making an elastic composite fabric, an elastomeric member is stretched and then bonded to a gatherable web. The resultant structure is then relaxed causing the elastomeric member to retract and the second web to gather and buckle. This technique is illustrate, for example, by Bassett, U. S. Pat. No. 3,468,748, Hansen, U. S. Pat. No. 3,575,782, and Morman, U. S. Pat. No.4,657,802, among others.

Although, the above-described methods have provided composite fabrics with some elasticity, such known structures usually are thin and dense. However, for quilted fabrics, thicker, less dense structures having improved conformability, stretchability and resilience are desired. Accordingly, it is an object of this invention to provide such a desirable quilted fabric.

SUMMARY OF THE INVENTION

A quilted composite fabric having a thickness of at least 6 mm, a unit weight of at least 75 g/m$^2$, a density of no greater than 0.05 g/cm$^3$ and stretchability of at least 25%, in at least one direction, the composite fabric comprising a gathered fibrous layer, an elastic fabric layer containing elastic spandex fiber which amounts to between $\frac{1}{2}$ and 10% of the weight of the elastic fabric layer and no more than 5% of the total weight of the quilted composite, the layers being quilted with thread that forms spaced-apart patterns of stitches extending along the composite fabric.

In a preferred embodiment, the elasticated fabric is a multi-needle stitched nonwoven fabric wherein the stitching thread is an elastic thread, preferably of spandex polymer, that forms parallel patterns of stitches along the elastic fabric layer, the parallel stitch patterns having a spacing of 2 to 10 parallel stitch patterns per centimeter and the stitch spacing being in the range of 2 to 15 per centimeter, the unit weight of the elastic fabric layer amounting to no more than one-half of the total weight of the composite fabric.

The present invention also provides a process for producing a quilted elastic composite fabric comprising the steps of:

providing a fabric layer oontaining latently elastic fibers which amount to between $\frac{1}{2}$ to 10% by weight of the fabric layer, quilt-stitching the fabric layer to a web of substantially nonbonded fibers with quilt-stitching patterns that are spaced in the range of 12 to 200 mm apart to form a quilted composite, with the thusly formed quilted composite in a relaxed condition, activating the latently elastic fibers sufficiently to provide to the resultant quilted composite fabric a stretchability of at least 25% in at least one direction and a density of no greater than 0.05g/cm$^3$.

In a preferred embodiment of the process, the latently elastic fibers are spandex fibers whose elastic characteristics are activated by heating the quilted composite fabric at a temperature of at least 70° C. for a sufficient time to shrink the spandex fibers and reduce the fabric area by at least 25% while increasing its thickness at least 2.5 times. Preferred conditions for the process include heating at a temperature of at least 100° C. and increasing the thickness at least 10-fold.

The quilted fabric of the invention is suited for any use that requires the fabric to conform to irregular surfaces without wrinkling. Typical uses include cushioning, thermal insulation for cold weather clothing, protective shipping wrap for furniture, instruments and fragile parts, and bandages, especially elastic ones such as are used for wrapping of knee or elbow joints.

DETAILED DESCRIPTION OF PREFERRED EMBODIENTS

As used in this application, the term "fiber" includes staple fibers or continuous filaments. "Spandex" has its usual meaning, that is, a long chain synthetic polymer that comprises at least 85% by weight segmented polyurethanes. The term "stitch-bonded" refers to the result of a conventional multi-needle stitching operation performed on a nonwoven fibrous substrate with equipment, such as "Arachne", or "Mali" (including Malimo, Malipol and Maliwatt) machines. "Latently elastic" describes the ability of certain fibers to become elastic when the fibers are are exposed to a treatment that causes them to retract at least 25%. "Lycra" Type 126 spandex yarns, available commercially from E. I. du Pont de Nemours and Company, are suitable for use as such latently elastic yarns.

In the discussion and examples which follow, the invention will be illustrated primarily with sewn-stitch quilting. However, it is believed that equivalent quilting could be achieved by thermal or ultrasonic bonding along bond lines, which may be interrupted or continuous and which from the same type of patterns as are made in sewn-stitch quilting.

Various patterns of quilt stitching are suitable for the quilted elastic composite fabrics of the present invention, provided that there is ample space between the stitch patterns. Suitable stitch patterns include straight lines, zig-zag lines, crossing gropus of parallel lines that form diamond patterns, and the like. Also, the stitching can be limited to isolated points throughout the fabric. When straight or zig-zag lines of stitches are used, the spacing between the lines usually is at least 12 millimeters, and can be as much as 200 mm, or more. Individual points or areas of quilt stitching are similarly separated from each other, as are the parallel lines of diamond quilting patterns.

Substantially any thread, conventional sewing thread for example, is suitable for the quilt-stitching thread used in the present invention.

In accordance with the present invention, the elastic quilted fabric comprises at least two fibrous layers which are quilted together. One layer, which may be in the form of a conventional fiber batt or a conventional knitted, woven or nonwoven fabric, is "buckled". This means that substantial portions of the fibers, or of the fabric, of this layer are not parallel to the plane of the quilted fabric.

In addition to the buckled fibrous layer, at least one layer of the quilted elastic composite fabric of the invention is an elastic layer. This elastic layer is comprised of about ½ to 10 % by weight of elastic fibers. The layer may be woven, knitted or nonwoven. The elastic layer may be a stitch-bonded nonwoven fabric in which the stitch-bonding thread is an elastic thread. Preferred elastic threads and fibers are provided by spandex elastomeric fibers.

It is essential for the fabrics of the present invention that the elasticity of the elastic layer of the quilted fabric be developed after the quilted fabric has been made, not before the quilting step. During the fabrication of the quilted composite fabric, the elastic layer has the characteristic referred to herein as "latent elasticity". This characteristic of latent elasticity permits the layers to be quilted together in a flat, substantially non-tensioned condition. Then, after the quilting step, the quilted composite is shrunk by a suitable treatment, during which the latently elastic fibers of the layer shrink and become elastic. For example, if a spandex fibers are employed as the latently elastic fibers, mild heating at temperatures of at least 70° C. can activate a shrinkage of at least 25% and impart elasticity to the fibers. Higher temperature heating can provide the desired shrinkage and elasticity more rapidly.

Stitch-bonded elastic fabrics are preferred for the elastic layer of the quilted composite fabrics of the present invention. The stitch-bonded fabric can be made by the general techniques disclosed in Zafiroglu, U. S. Pat. No. 4,704,321, and application Ser. No. 85,167, filed Aug. 14, 1987, now U. S. Pat. No. 4,773,238, the entire disclosures of which are hereby incorporated herein by reference. In these disclosures, the stitch-bonding usually is performed with a spandex yarn that is under tension, so that when the tension is released upon removal of the stitch-bonded fabric from the multi-needle stitching machine, the fabric contracts and is elastic. In contrast, in accordance with the present invention, it is necessary to develop the elasticity after the elastic layer has been quilted to the other layers of the composite fabric. U. S. Pat. No. 4,704,321, at column 3, lines 63–65, mentions the possibility of using yarns that can be made to shrink after multi-needle stitching.

The particular stitch-bonded elastic fabric that is preferred for use as the elastic layer of the composite fabric of the present invention is made with a spandex elastomeric yarn that is covered with a conventional textile fiber (e.g., nylon). This covered yarn forms parallel lines of chain or tricot stitches along a nonwoven batt of ordinary non-elastomeric fibers. The parallel lines of stitches are spaced closely together, having a spacing of 2 to 10 lines of stitches per centimeter, with a stitch spacing within the line of about 2 to 15 per cm. The weight of the elastic layer is usually in the range of 20–150g/$m^2$, with 50 to 100 g/$m^2$ being preferred.

To perform satisfactorily in providing elastic characteristics to the quilted composite fabric of the invention, the elastic layer usually contains between 2 and 20 % by weight of elastic fibers. Also, the elastic layer provides no more than about half the total weight of the composite fabric, and sometimes as little as one-tenth or less of the total weight.

Various combinations of quilt-stitching patterns, buckled layer fabrics, layer weights, elastic and non-elastic outer layers, mid-layer arrangements, etc. can be used to form a wide variety the quilted composite fabrics of the invention. Such combinations are illustrated in the Examples below. The layers of the quilted composite fabrics can be selected to emphasize various desired characteristics of the composite, such as stretchability in the longitudinal or transverse directions of the quilted composite fabric, conformability, resilience, bulk, thermal insulation, and the like. The particular fibers in the gathered fibrous layer can also be selected to provide the quilted composite with characteristics such as fire retardency, liquid absorbency, thermal moldability, and the like.

The gathered fibrous layer may itself be somewhat elastic, provided that a sufficient differential in shrinkage exists between the buckled layer and the elastic fabric layer to permit the desired degree of buckling and gatherering in the final quilted composite fabric. Usually, the elastic fabric layers shrink at least 25 % more in area than do the gathered fibrous layers. The area shrinkage results in an increase in the thickness of the composite fabric that is much greater than one would expect from the reduction in area. The density of the composite fabric is also greatly reduced by the shrinkage. This effect is illustrated in the Examples below. The final quilted composite is usually at least 2.5 times as thick as the composite is before the shrinkage and elasticity activation steps. Ten- to twenty-fold thickness increases can be achieved.

One can also employ outer fabric layers for the quilted composite fabric that are different from the gathered fibrous layer or the elastic layer. For example, sometimes a woven sateen fabric or a parachute cloth or virtually, any other type of fabric can be employed for the outer fabric layers.

In the examples which follow the following tests are employed to measure various characteristics of the quilted composite fabrics of the invention.

Fabric thickness is measured by placing the fabric flat on a table, measuring the combined table and fabric thickness with a caliper that just touches the top of the fabric (i.e., with no compression), and then subtracting the thickness of the table.

The density is simply determined from the weight of the fabric in grams per square meter and the thickness of the fabric.

Stretchability is measured by placing the sample on a flat table, clamping each end in a bar clamp which covers ½ in (1.2 cm) of the fabric, and pulling until the quilting stitches begin to tear the fabric. Stretchability is expressed as a "% Stretch", which is the stretched length (or width) divided by the relaxed as-made length (or width).

EXAMPLES 1-8

These examples illustrate a few of the various quilted fabrics that can be made in accordance with the present invention.

The following starting materials were used.

Elastic fabric layer (referred to as "E").

A batt was prepared by carding together 75% of 3.3 dtex T-72 "Orlon" acrylic staple fibers and 25% of 3.3 dtex "Dacron" T-262 polyester staple fibers (both sold by E. I. du Pont de Nemours and Company) on a Hergeth Dual Card. The length of the staple fibers averaged 1 ½ in (3.8 cm). The batt weighed 2 oz/sq yd (68 oz/sq m). The batt was lightly bonded with a Kusters Bonder operating at a temperature of 140° C. with a patterned bonding roll that had 6.3 points per centimeter in the length and width directions, each point being 0.030 in (0.07 cm) in diameter. After bonding, the batt was stitch-bonded with 22-dtex "Lycra" spandex yarn which has been wrapped with 22-dtex nylon yarn. A multi-needle stitching machine of the type disclosed in Zafiroglu, U. S. Pat. No. 4,704,321, Example 1, was employed to provide a tricot-stitch pattern with 12 stitches/in (4.7 stitches/cm). The elastic fabric was 0.13 cm thick and contained less than about 1 % of spandex fibers.

Gathered fabric layer (referred to as "B").

A commercial carded web batt of "Holofil" "Dacron" polyester fiber was used. The batt weighed 2.6 oz/sq yd (88 g/sq m) and was 0.55-cm thick. This batt is typical of conventional "quilt-batting" materials.

Other fabric layer (referred to as "H").

A commercial woven nylon cloth, f the type commonly called "parachute cloth", weighing 3 oz/sq yd (102 g/sq m) and having a thickness of 0.016 cm was used for an outer fabric layer in several of the examples.

Quilting thread.

A nominal 330-dtex polyester sewing thread was used with a "Bernina" G30, electronic sewing machine.

In each example, the staple fibers of the batt that was to form the gathered layer B and the multi-needle stitch-bonding patterns of the fabric that was to become the elastic fabric layer E were aligned in the same direction when being fed to the sewing machine that provided the quilting. In Examples 1-4, a zig-zag stitch quilting pattern was used, with stitch rows being 3 in (7.6 cm) apart, each row being formed of 3 stitches per cm, each stitch being of 0.3 cm wide. For examples 5 and 6 the quilting stitch pattern was arranged so that the lines of stitches (made and spaced as in examples 1-4) crossed at 90 degree angles to form a diamond pattern and the multi-needle stitch-bonding of the elastic layer was oriented at 45 degrees to the quilting stitching. In Examples 7 and 8, the quilting pattern was arranged to provide small individual "button-hole" stitched areas, measuring about ½ by ⅛ inch (1.3 by 0.32 cm), and being spaced 3 inches (7.6 cm) apart in a diamond pattern.

The same heat treatment was used in each example to activate the elasticity of the spandex fibers, to shrink the quilted fabric and to cause the fibrous layer B to gather and buckle. In each example, the quilted composite fabric was heat treated for 30 minutes in a unrestrained condition in an oven operated at 100° C.

Measurements were made of the quilted composite fabric dimensions and density, before and after heat treatment, and of the fabric stretchability after heat treatment. The results of these measurements are recorded in the table below. The construction of the various layers of the fabrics of the Examples was as follows:

EXAMPLE 1 (E/B/E).

A three-layer quilted composite was prepared with batt (B) sandwiched between two elastic stitch-bonded layers (E).

EXAMPLE 2 (H/B/E/B/H).

A five-layer quilted composite was prepared with two outside layers of parachute cloth (H) adjacent to batts (B) which in turn were adjacent to an elastic stitch-bonded layer (E) in the center.

EXAMPLE 3 (E/B/H).

A three-layer quilted composite was prepared with one outer layer of elastic stitch-bonded fabric (E), the other outer layer of parachute cloth (H) and batt (B) between the two outer layers.

EXAMPLE 4 (E/H).

A two-layer quilted composite was, prepared with an elastic stitch-bonded layer (E) and a parachute cloth (H).

EXAMPLE 5 (E/B/H).

A three-layer quilted composite was prepared as in Example 3 but with the different quilting pattern mentioned above.

EXAMPLE 6 (H/E/E/H).

A four-layer quilted composite was prepared with parachute cloth (H) as both outside layers and two adjacent elastic stitch-bonded layers therebetween.

EXAMPLE 7 (E/B/E).

A three-layer quilted composite was prepared as in Example 1 but with the different quilting pattern mentioned above.

EXAMPLE 8 (E/E/H).

A three-layer quilted composite was prepared with an elastic stitch-bonded layer (E) between another elastic stitch-bonded layer (E) and parachute cloth (H).

The quilted fabrics prior to heat treatment were only slightly stretchable. Of the four samples measured, stretchability before heat treatment varied from 0 to 6%. All the heat-treated quilted composite fabrics were capable of stretching to at least their original (as-quilted before heat treatment) length. After stretching, the quilted and heat-treated fabrics returned to within 3% of the pre-stretched dimension. Note, as shown in the table, the large decrease in density of the quilted composite fabric and the large increase in the thickness of the quilted composite fabric that occured as a result of the heat treatment. Depending on the particular structure tested, the heat treatment and accompanying shrinkage of the fabric caused thickness increases of between 2.8 and 22.5 times the thickness of the composite prior to heat treatment.

TABLE

| | (Part 1) | | | |
|---|---|---|---|---|
| Example Number | 1 | 2 | 3 | 4 |
| As quilted[1] | | | | |
| Width, cm | 37.8 | 36.7 | 38.4 | 38.5 |
| Length, cm | 83.9 | 86.9 | 89.2 | 89.5 |
| Thickness, cm | 0.61 | 1.40 | 0.70 | 0.15 |
| Density, g/cm$^3$ | 0.047 | 0.034 | 0.04 | 0.12 |
| Heat-treated | | | | |
| Width, cm | 28.0 | 30.5 | 26.4 | 30.0 |
| Length, cm | 39.0 | 60.0 | 46.0 | 39.0 |
| Thickness, cm | 2.83 | 4.66 | 3.70 | 3.33 |
| Density, g/cm$^3$ | 0.029 | 0.018 | 0.021 | 0.017 |
| % Stretch | | | | |
| longitudinal | 113 | 45 | >25 | >25 |
| transverse | 43 | 20 | nm[3] | nm |
| Thickness Ratio[2] | 4.6 | 3.3 | 5.3 | 22.5 |
| | (Part 2) | | | |
| Example Number | 5 | 6 | 7 | 8 |
| As quilted[1] | | | | |
| Width, cm | 53.7 | 53.0 | 54.4 | 56.1 |
| Length, cm | 87.0 | 88.5 | 82.0 | 87.8 |
| Thickness, cm | 0.71 | 0.37 | 0.78 | 0.39 |
| Density, g/cm$^3$ | 0.039 | 0.100 | 0.032 | 0.068 |
| Heat-treated | | | | |
| Width, cm | 40.2 | 26.2 | 43.9 | 24.5 |
| Length, cm | 41.8 | 45.7 | 35.1 | 37.8 |
| Thickness, cm | 2.40 | 3.69 | 2.75 | 4.57 |
| Density, g/cm$^3$ | 0.032 | 0.039 | 0.026 | 0.031 |
| % Stretch | | | | |
| longitudinal | >25 | 93 | 149 | >25 |
| transverse | >25 | 104 | 30 | >25 |
| Thickness Ratio[2] | 2.8 | 10.0 | 3.5 | 11.7 |

Notes:
[1] Prior to heat treatment.
[2] Thickness after heat treatment to thickness before heat treatment.
[3] nm = no measurement made

I claim:

1. A quilted composite fabric having a thickness of at least 6 mm, a unit weight of at least 75 g/m$^2$, a density of no greater than 0.05 g/cm$^3$ and stretchability of at least 25% in at least one direction, the composite fabric comprising
   a gathered fibrous layer,
   an elastic fabric layer containing elastic spandex fiber which amounts to between ½ and 10% of the weight of the elastic fabric layer and no more than 5% of the total weight of the quilted composite,
   the layers being quilted with thread that forms spaced-apart patterns of stitches extending along the composite fabric.

2. A quilted composite fabric of claim 1, wherein the elastic fabric layer is a multi-needle stitched nonwoven fabric in which the stitching thread is an elastic thread that forms parallel patterns of stitches along the elastic fabric layer, the parallel stitch patterns havinq a spacing of 2 to 10 parallel stitch patterns per centimeter and the stitch spacing being in the range of 2 to 15 per centimeter, the unit weight of the elastic fabric layer amounting to no more than one-half of the total weight of the composite fabric.

3. A quilted complosite fabric of claim 2 wherein elastic thread is made of a spandex polymer.

4. A quilted composite fabric of claim 2 or 3 wherein the gathered fibrous layer is formed from a carded staple fiber batt which is quilted to and located between two of the elastic fabric layers.

5. A quilted composite fabric of claim 3 or 4 wherein a woven or knitted outer layer is included in the quilted composite fabric.

6. A process for producing a quilted elastic composite fabric comprising the steps of:
   providing a fabric layer containing latently elastic fibers which amount to between ½ to 10% by weight of the fabric layer,
   quilt-stitching the fabric layer to a web of substantially nonbonded fibers with quilt-stitching patterns that are spaced in the range of 12 to 200 mm apart to form a quilted composite,
   with the thusly formed quilted composite in a relaxed condition, activating the latently elastic fibers sufficiently to provide to the resultant quilted composite fabric a stretchability of at least 25% in at least one direction and a density of no greater than 0.05g/cm$^3$.

7. A process of claim 6 wherein the latently elastic fibers are spandex fibers whose elastic characteristics are activated by heating the quilted composite fabric at a temperature of at least 70° C. for a sufficient time to shrink the spandex fibers and reduce the fabric area by at least 25% while increasing its thickness at least 2.5 times 8. A process of claim 7 wherein the heat treatment is at a temperature of at least 100° C. and the thickness increases at least 10-fold.

* * * * *